United States Patent [19]
Sunohara

[11] Patent Number: 5,163,675
[45] Date of Patent: Nov. 17, 1992

[54] SHEET FEED MECHANISM FOR PLOTTER

[75] Inventor: Ichiro Sunohara, Ueda, Japan

[73] Assignee: Mimaki Engineering Co., Ltd., Nakano, Japan

[21] Appl. No.: 709,024

[22] Filed: May 31, 1991

[51] Int. Cl.⁵ ............................................. B65H 5/02
[52] U.S. Cl. ................................ 271/274; 271/272; 400/636; 346/134
[58] Field of Search ..................... 271/272, 273, 274; 400/636, 637.1, 641; 346/134, 136

[56] References Cited

U.S. PATENT DOCUMENTS

| | | | |
|---|---|---|---|
| 3,980,295 | 9/1976 | Kleid | 271/272 X |
| 4,205,770 | 6/1980 | Wojdyla | 271/273 X |
| 4,621,802 | 11/1986 | Ishida et al. | 271/272 |

FOREIGN PATENT DOCUMENTS

| | | | |
|---|---|---|---|
| 191222 | 8/1986 | European Pat. Off. | 346/134 |
| 97968 | 8/1979 | Japan | 271/171 |
| 187572 | 9/1985 | Japan | 400/636 |
| 158275 | 7/1988 | Japan | 400/636 |
| 2136734 | 9/1984 | United Kingdom | 400/636 |

Primary Examiner—Robert P. Olszewski
Assistant Examiner—Boris Milef
Attorney, Agent, or Firm—Price, Gess & Ubell

[57] ABSTRACT

A sheet feed mechanism for a plotter comprises a main drive roller, and a plurality of sub drive rollers which are serially arranged at predetermined spacings from the main drive roller. A main pinch roller is arranged in opposition to the main drive roller so as to be rotatable and movable over and axially of the main drive roller, and a sub pinch roller is arranged in opposition to the sub drive rollers so as to be rotatable and movable over and axially of the sub drive rollers. The axial length of the main drive roller is made greater than that of the main pinch roller. The side edges of a sheet are respectively held between the main drive roller and the main pinch roller and between one of the sub drive rollers and the sub pinch roller, and the main and drive rollers are synchronously rotated, thereby to feed the sheet in the lengthwise direction thereof. In case of feeding a broad sheet, the sub pinch roller is located so as to overlie the sub drive roller remoter from the main drive roller, and in case of feeding a narrow sheet, the sub pinch roller is located so as to overlie the sub drive roller closer to the main drive roller, whereupon one side edge of the sheet is held between the sub drive and pinch rollers.

12 Claims, 5 Drawing Sheets

SHEET FEED MECHANISM FOR PLOTTER

Background of the Invention

1. Field of the Invention

The present invention relates to a plotter which automatically depicts figures, characters etc. of predetermined shapes on the surface of a sheet or automatically cuts figures, characters etc. of predetermined shapes in the surface of a sheet while moving the sheet on a recording surface. More particularly, it relates to a sheet feed mechanism for use in the plotter.

2. Description of Related Art

Heretofore, there has been a plotter called a paper moving type wherein a cutter for cutting a sheet is mounted on a pen carriage.

The plotter includes a sheet feed mechanism which moves the sheet in the lengthwise direction thereof on a recording surface of a semicylindrical form or the like. Also, it includes movement means for moving the pen carriage bearing the cutter, on the recording surface and in the widthwise direction of the sheet orthogonal to the moving direction thereof.

With this plotter, while the sheet placed on the recording surface is being moved in the lengthwise direction thereof by the sheet feed mechanism, the pen carriage with the cutter held in contact with the sheet is moved across the sheet on the recording surface in the widthwise direction of the sheet by the movement means. Thus, the sheet can be cut into a predetermined shape.

Meanwhile, the sheet to be cut by the plotter for, e.g., advertisement or preparing an apparel pattern has a multilayer structure or is formed using a thick film of synthetic resin. Many of such sheets are expensive.

Therefore, the remaining part of the sheet cut from the predetermined shape is not discarded as it is, but generally it is effectively utilized as a small-sized sheet for, e.g., advertisement or preparing an apparel pattern.

In the plotter for cutting such sheets, accordingly, the sheet feed mechanism is so constructed that the sheets having various widths can be moved in the lengthwise directions thereof.

One example of the sheet feed mechanism will be explained. In the sheet feed mechanism, a longer main drive roller and a shorter sub drive roller are rotatably mounted with a spacing therebetween in the identical axial direction thereof. In addition, a shorter movable pinch roller is mounted in opposition to the main drive roller so as to be rotatable and to be movable over the main drive roller and in the lengthwise direction thereof. Also, a shorter stationary pinch roller is mounted in opposition to the sub drive roller so as to be rotatable over the sub drive roller. With this sheet feed mechanism, one side edge of the sheet is held between the sub drive roller and the stationary pinch roller opposing thereto, and the movable pinch roller is moved so as to hold the other side edge of the sheet between the main drive roller and the adjusted movable pinch roller. Under this state, the main and sub driver rollers are synchronously rotated at equal peripheral speeds in the respective normal and reverse directions thereof. Thus, the sheet is fed in the lengthwise direction thereof.

Herein, the length of the main drive roller must be made relatively great in order that, using the sheet feed mechanism, all the sheets having various widths across a wide range may be moved in the lengthwise directions thereof in the state in which both the side edges of each sheet are properly held between the sub drive roller and the stationary pinch roller and between the main drive roller and the movable pinch roller, respectively.

The formation of the very long main drive roller, however, requires much labor as well as veteran skill and is extremely difficult.

The reason is as follows: In order to be capable of holding the sheet reliably irrespective of the widthwise dimension thereof, the main drive roller must be formed so that, no matter where the movable pinch roller overlies, the peripheral surface of the main drive roller may always come into uniform contact with the held sheet without unequal contact pressures. For this purpose, the diameter, straightness etc. of the main drive roller is referred to be finished at very high precisions.

It has therefore been attended with much difficulty and been unsuitable for mass-production in a factory etc. that the sheet feed mechanism is fabricated into one by which all the sheets having various widths in a wide range can be moved in the lengthwise directions thereof.

SUMMARY OF THE INVENTION

The present invention has been made in view of the above problem involved in the prior art.

Accordingly, the present invention has for its object to provide a sheet feed mechanism for a plotter by which sheets having various widths in a wide range can be moved in the lengthwise directions thereof.

In addition, it is an object of the present invention to provide a sheet feed mechanism for a plotter which dispenses with a longer main drive roller requiring very high precisions in fabrication and which is suitable for mass-production.

Further, it is an object of the present invention to provide a sheet feed mechanism for a plotter by which all sheets having various widths in a predetermined range can be moved in the lengthwise directions thereof fully without waste.

According to the present invention, there is provided a sheet feed mechanism for a plotter comprising a drive roller group including a first drive roller, and a plurality of second drive rollers which are serially arranged at predetermined spacings from the first drive roller; and a pinch roller group including a first pinch roller which is opposite to the first drive roller and offset which is rotatable and movable over and axially of the first drive roller, and a second pinch roller which is opposite to the second drive rollers and offset which is rotatable and movable over and axially of the second drive rollers. Herein, the axial length of the first drive roller is made greater than that of the first pinch roller. Thus, a sheet is held between the drive roller group and the pinch roller group, and the drive roller group is rotated, thereby to move the sheet in the lengthwise direction thereof.

In a preferable aspect of performance, the second drive rollers are respectively arranged so that the distance between the outer end face of the first drive roller and the outer end face of any selected one of the second drive rollers may be equal to the sum of the width of the first pinch roller and the distance between the inner end face of the first drive roller and the outer end face of another of the second drive rollers adjoining the selected second drive roller on a side remote from the first drive roller.

DESCRIPTION OF THE PREFERRED EMBODIMENTS

Before the detailed description of the preferred embodiments of the present invention, the related prior art will be briefly explained with reference to FIG. 1. In the sheet feed mechanism shown in FIG. 1, a single longer main drive roller 12 and a single shorter sub drive roller 14, each of which has fine ruggedness or milling 10 for preventing slip at its peripheral surface, are serially juxtaposed with a predetermined spacing therebetween and are rotatably mounted. In addition, a shorter movable pinch roller 16 is mounted over and opposite to the main drive roller 12 so as to be rotatable and to be movable over the main drive roller 12 and in the lengthwise direction thereof (as indicated by a double-headed arrow in FIG. 1). Besides, a shorter stationary pinch roller 18 is mounted over and opposite to the sub drive roller 14 so as to be rotatable.

Figure 1:
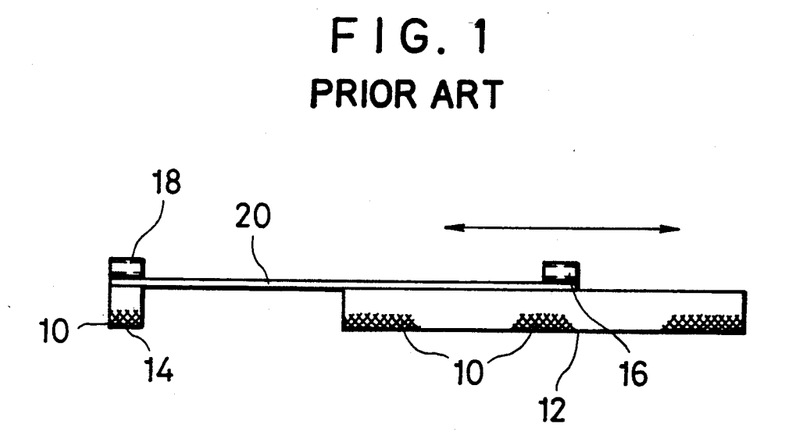
FIG. 1 is a front view showing the schematic construction of a sheet feed mechanism for a plotter in the prior art.

With the sheet feed mechanism, as illustrated in FIG. 1, one side edge of a sheet 20 is held between the sub drive roller 14 and the stationary pinch roller 18 overlying this drive roller 14, and the movable pinch roller 16 is moved over the main drive roller 12 onto the other side edge of the sheet 20 so as to hold the other side edge of the sheet 20 between the main drive roller 12 and the adjusted movable pinch roller 16. Under this state, the main drive roller 12 and the sub driver roller 14 are synchronously rotated at equal peripheral speeds in the respective normal and reverse directions thereof. Thus, any of the sheets 20 having various widths can be fed in the lengthwise direction thereof.

The sheet feed mechanism in the prior art, however, has a problem to be solved as stated, before.

Figure 2:
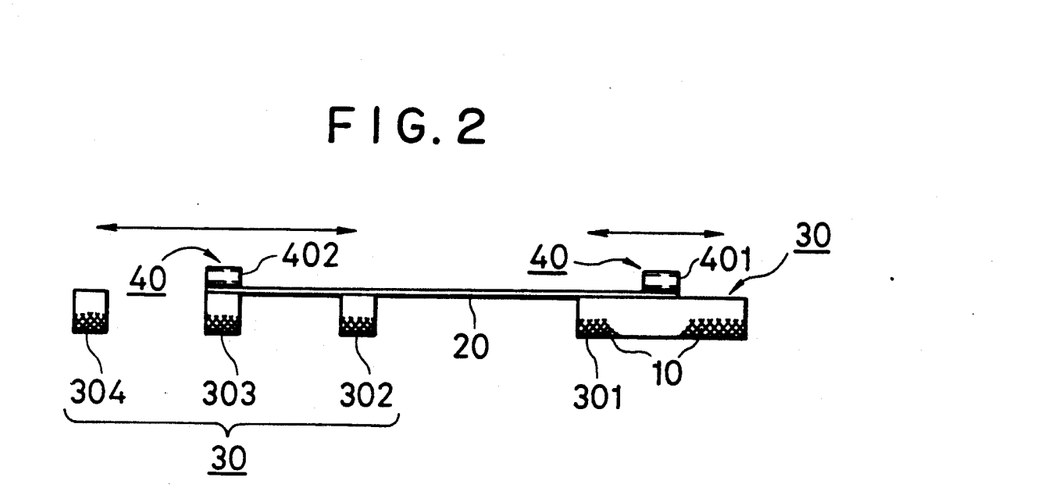
FIG. 2 is a front view showing the schematic construction of an embodiment of a sheet feed mechanism for a plotter according to the present invention.
Figure 3:
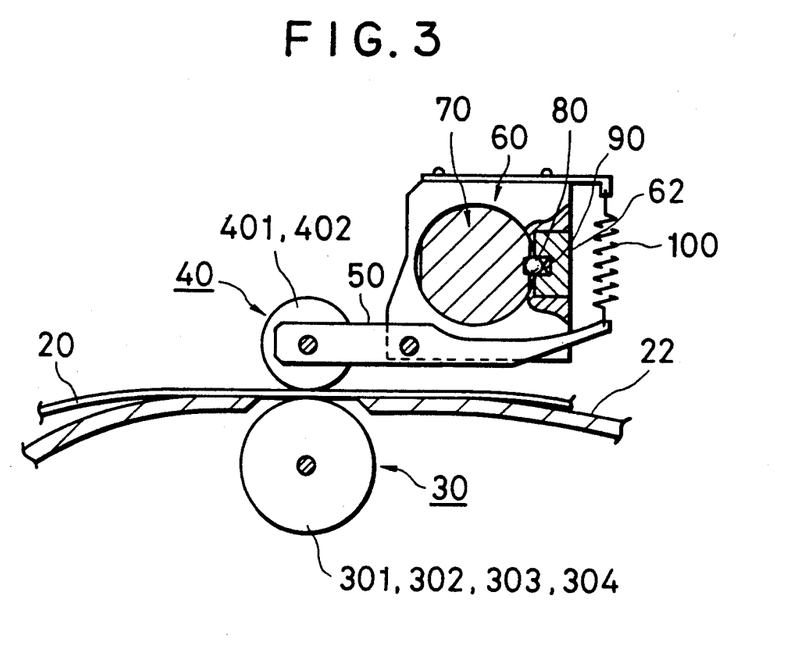
FIG. 3 is a partially-enlarged sectional side view of the vicinity of drive rollers as well as pinch rollers.
Figure 4:
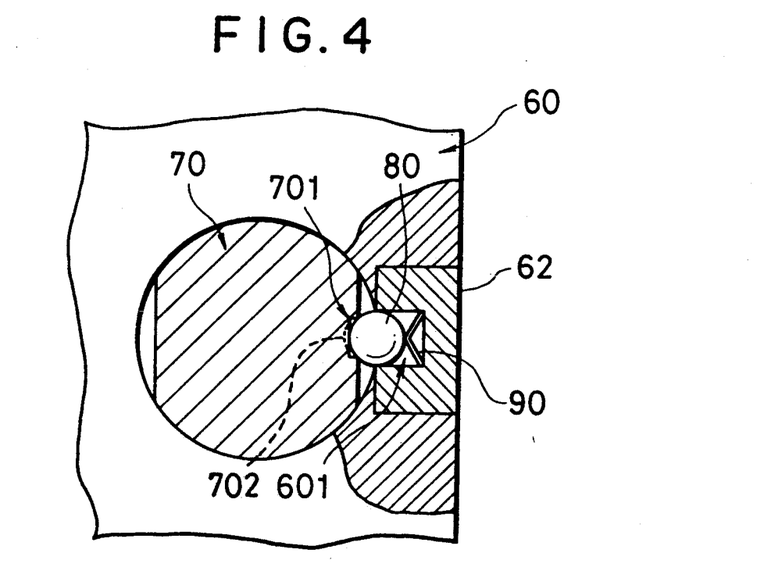
FIG. 4 is a partially-enlarged sectional side view of the vicinity of a clamp shaft shown in FIG. 3.

Now, one embodiment of the present invention will be described in conjunction with the drawings. Referring to FIGS. 2 thru 4, numeral 22 designates a recording surface of semicylindrical form or the like, on which a sheet 20 to be cut by a cutter (not shown) mounted on a pen carriage (not shown) is placed.

In addition, numeral 301 indicates a single longer main drive roller which serves to hold the sheet 20, and the peripheral surface of which is formed with fine ruggedness or milling, such as knurling, 10 for preventing slip.

Numerals 302, 303 and 304 indicate a plurality of (in the illustration, three) shorter sub drive rollers which similarly serve to hold the sheet 20, and the peripheral surfaces of which are similarly formed with fine ruggedness or milling, such as knurling, 10 for preventing slip.

Herein, the plurality of shorter sub drive rollers 302, 303 and 304 are serially arrayed at predetermined spacings so as to succeed the longer main drive roller 301 in the order mentioned. The single main drive roller 301 and the plurality of sub drive rollers 302, 303 and 304 constitute a drive roller group 30. Also, as clearly shown in FIG. 3, the main drive roller 301 and the sub drive rollers 302, 303 and 304 are installed inside the recording surface 22 with parts of their peripheral surfaces exposed over this recording surface 22.

Shown at numeral 401 is a shorter main pinch roller which holds the sheet 20 in cooperation with the main drive roller 301. The shorter main pinch roller 401 is mounted over and opposite to the longer main drive roller 301 so as to be rotatable and to be movable over this main drive roller 301 and in the lengthwise direction, namely, axial direction thereof.

Numeral 402 denotes a shorter sub pinch roller which similarly holds the sheet 20 in cooperation with the shorter sub drive rollers 302, 303 and 304. The shorter sub pinch roller 402 is mounted over and opposite to the shorter sub drive rollers 302, 303 and 304 so as to be rotatable and to be movable over these sub drive rollers 302, 303 and 304 and in the lengthwise direction thereof to a position overlying any of these sub drive rollers.

Herein, the shorter main pinch roller 401 and the shorter sub pinch roller 402 are serially arrayed, and they constitute a pinch roller group 40.

There will be described in detail a support mechanism by which both the main pinch roller 401 and the sub pinch roller 402 are respectively supported over the main drive roller 301 and over the plurality of serially-arrayed sub drive rollers 302, 303 and 304 so as to be movable in the lengthwise direction of the pinch rollers (as indicated by double-headed arrows in FIG. 2). As shown in FIGS. 3 and 4, the main and sub pinch rollers 401, 402 are rotatably supported at the fore end of each arm 50, and the arm 50 is pivotally supported on a corresponding supporter 60. In addition, a clamp shaft 70 is mounted so as to extend over the recording surface 22 transversely, in other words, in the widthwise direction of the recording surface 22 orthogonal to the moving direction of the sheet 20, and the supporters 60 are snugly fitted on the clamp shaft 70 so as to be movable over the recording surface 22 and in the widthwise direction thereof along the periphery of the shaft 70. Besides, a slot 701 having a rectangular vertical section is formed in part of the peripheral surface of the clamp shaft 70 so as to extend in parallel with the axis of the shaft 70. Also, a blind hole 601 is formed in the inner peripheral surface of a retainer 62 disposed in opposition to the slot 701, and a small ball 80 is loosely fitted in the blind hole 601. Further, a V-shaped leaf spring 90 is inserted in the inner bottom of the blind hole 601, and it urges the small ball 80 loosely fitted in the blind hole 601, outwards of this blind hole 601. Moreover, the leaf spring 90 holds part of the peripheral surface of the small ball 80 in pressed contact with the inner bottom surface of the slot 701 formed in the peripheral surface of the clamp shaft 70. Thus, the supporters 60 supporting the main and sub pinch rollers 401, 402 through the arms 50 are moved to the predetermined right and left positions of the clamp shaft 70 along the periphery of this shaft, owing to the small balls 80 and that slot 701 in the peripheral surface of the clamp shaft 70 with which the partial peripheral surfaces of these small balls are held in pressed contact. Then, the main and sub pinch rollers 401, 402 supported on the respective supporters 60 through the corresponding arms 50 can be set at the predetermined positions of the clamp shaft 70 in such a condition that the supporters 60 do not easily shift in either of the axial and circumferential directions of the clamp shaft 70. Here, dents 702 each serving to fittingly receive part of the peripheral surface of the ball 80 are provided at predetermined intervals in the inner bottom part of the peripheral slot 701 of the clamp shaft 70. By fitting the small ball 80 into the dent 702, accordingly, the sub pinch roller 402 moved so as to overlie any of the plurality of sub drive rollers 302, 303 and 304 can be set in such a condition that the corresponding supporter 60 is positioned and fixed to the periphery of the clamp shaft 70. In addition, coiled tension springs 100 are respectively extended between the supporters 60 and the rear ends of the corresponding arms 50 for pivotally supporting the main and sub pinch rollers 401, 402 on the supporters 60. The coiled springs 100 hold the peripheral surfaces of the main pinch roller 401 and sub pinch roller 402 rotatably supported at the fore ends of the arms 50, in pressed contact under predetermined pressures with those of the main drive roller 301 and sub drive roller 302, 303 or 304 opposing to the pinch rollers 401 and 402, respectively. Besides, the clamp shaft 70 is turnably supported over the recording surface 22. Accordingly, the main and sub pinch rollers 401 and 402 can be easily and smoothly slide along the circumference and axis of the clamp shaft 70 in such a way that the supporters 60 supporting these pinch rollers 401, 402 and snugly fitted around the clamp shaft 70 are respectively raised over the main and sub drive rollers 301 and 302, 303 or 304 by turning the clamp shaft 70.

The sheet feed mechanism shown in FIGS. 2, 3 and 4 is constructed as stated above.

Now, the operation of the sheet feed mechanism and examples of the uses thereof will be described.

In a case where a sheet 20 of great width is moved in its lengthwise direction on the recording surface 22 by the sheet feed mechanism of the above construction, the clamp shaft 70 is turned about its axis to raise the sub pinch roller 402 over the sub drive rollers 302, 303 and 304 and to raise the main pinch roller 401 over the main drive roller 301. Subsequently, the sub pinch roller 402 is slide in the lengthwise direction of the clamp shaft 70 along the periphery thereof, together with the supporter 60 supporting this pinch roller through the arm 50. Thus, the sub pinch roller 402 is moved so as to overlie the sub drive roller 303 or 304 on a side remote from the main drive roller 301, among the plurality of sub drive rollers 302, 303 and 304 which are serially arrayed at predetermined intervals. Here, the sub pinch roller 402 is set to be remote from the main drive roller 301 as the sheet 20 is broader. In addition, one side edge of the sheet 20 is placed on the sub drive roller 303 or 304 over which the sub pinch roller 402 has been moved. Under this state, the main pinch roller 401 is moved to the position of the other side edge of the sheet 20 over the longer main drive roller 301 in such a way that the supporter 60 supporting this pinch roller through the arm 50 is slide in the lengthwise direction of the clamp shaft 70 along the periphery thereof. Thereafter, the clamp shaft 70 is turned back to bring down the sub pinch roller 402 onto the underlying sub drive roller 303 or 304 and to bring down the main pinch roller 401 onto the underlying main drive roller 301. Then, one side edge of the sheet 20 is held between the sub pinch roller 402 and the sub drive roller 303 or 304 under a predetermined pressure based on the elastic force of the coiled tension spring 100 which is stretched between the arm 50 and the supporter 60. Simultaneously, the other side edge of the sheet 20 is held between the main pinch roller 401 and the main drive roller 301 under a predetermined pressure based on the elastic force of the coiled tension spring 100 which is stretched between the arm 50 and the supporter 60. At the next stage, the main drive roller 301 and the sub drive roller 303 or 304 are synchronously rotated in the respective normal and reverse directions thereof at equal peripheral speeds. Then, the broad sheet 20 can be fed in its lengthwise direction on the recording surface 22.

On the other hand, in a case where the sheet 20 of small width is moved in its lengthwise direction on the recording surface 22 by the sheet feed mechanism of the above construction, this mechanism is handled in the same manner as in the preceding case of moving the broad sheet 20 in its lengthwise direction on the recording surface 22. After the clamp shaft 70 is turned, the sub pinch roller 402 is moved so as to overlie the sub drive roller 302 or 303 on a side close to the longer main drive roller 301, among the plurality of shorter sub drive rollers 302, 303 and 304 serially arrayed at the predetermined intervals, in such a way that the supporter 60 supporting this pinch roller 402 through the arm 50 is slide in the lengthwise direction of the clamp shaft 70 along the periphery thereof. Here, the sub pinch roller 402 is set to be closer to the main drive roller 301 as the sheet 20 is narrower. In addition, one side edge of the sheet 20 is placed on the sub drive roller 302 or 303 over which the sub pinch roller 402 has been moved. Under this state, the shorter main pinch roller 401 is moved to the position of the other side edge of the sheet 20 over the longer main drive roller 301 in such a way that the supporter 60 supporting this pinch roller 401 through the arm 50 is slide in the lengthwise direction of the clamp shaft 70 along the periphery thereof. Thereafter, the clamp shaft 70 is turned back to bring down the sub pinch roller 402 onto the underlying sub drive roller 302 or 303 and to bring down the main pinch roller 401 onto the underlying main drive roller 301. Then, one side edge of the sheet 20 is held between the sub pinch roller 402 and the sub drive roller 302 or 303 under the predetermined pressure based on the elastic force of the coiled tension spring 100. Simultaneously, the other side edge of the sheet 20 is held between the main pinch roller 401 and the main drive roller 301 under the predetermined pressure based on the elastic force of the coiled tension spring 100. At the next stage, the main drive roller 301 and the sub drive roller 302 or 303 are synchronously rotated in the respective normal and reverse directions thereof at equal peripheral speeds. Then, the narrow sheet 20 can be fed in its lengthwise direction on the recording surface 22.

By the way, in a case where the sheet 20 of still greater or smaller width is moved in its lengthwise direction on the recording surface 22 by the sheet feed mechanism of the foregoing construction, at least one shorter sub drive roller (not shown) is added anew and is arrayed serially to the main drive roller 301 on a side at a larger distance from the main drive roller 301 or on a side still closer to the main drive roller 301 in succession to the plurality of sub drive rollers 302, 303 and 304, and one side edge of the still broader or still narrower sheet 20 is held between the sub drive roller added anew and the sub pinch roller 402 moved so as to overlie the added drive roller. Then, the still broader or still narrower sheet 20 can be fed in its lengthwise direction on the recording surface 22 by the sheet feed mechanism of the foregoing construction without making the main drive roller 301 still longer.

Now, the positional relationships among the main drive roller 301 and the sub drive rollers 302, 303 and 304 and the widths of the sheets 20 in the sheet feed mechanism contrived as stated above will be described with reference to FIGS. 5 thru 10.

The following condition is required in order that the respective side edges of each of the sheets 20 having widths in a predetermined range may be reliably held between the sub pinch roller 402 and any of the plurality of sub drive rollers 302, 303 and 304 and between the main pinch roller 401 and the main drive roller 301: In a case where the sub pinch roller 402 has been moved to overlie any of the plurality of sub drive rollers 302, 303 and 304 and where one side edge of the sheet 20 has been held between the sub pinch roller 402 and the underlying one of the sub drive rollers 302, 303 and 304, the other side edge of the sheet 20 must lie on the main drive roller 301 without missing this main drive roller.

Figure 5:
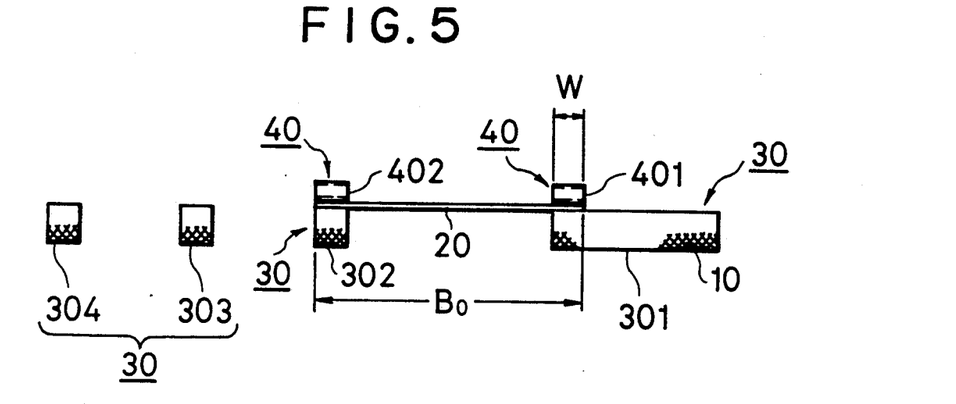
FIG. 5 is a front view showing the arrayal setup or arrangement of the main and sub drive rollers and the main and sub pinch rollers in the sheet feed mechanism of the present invention, and it illustrates one state of the mutual positional relationship of the rollers.
Figure 6:
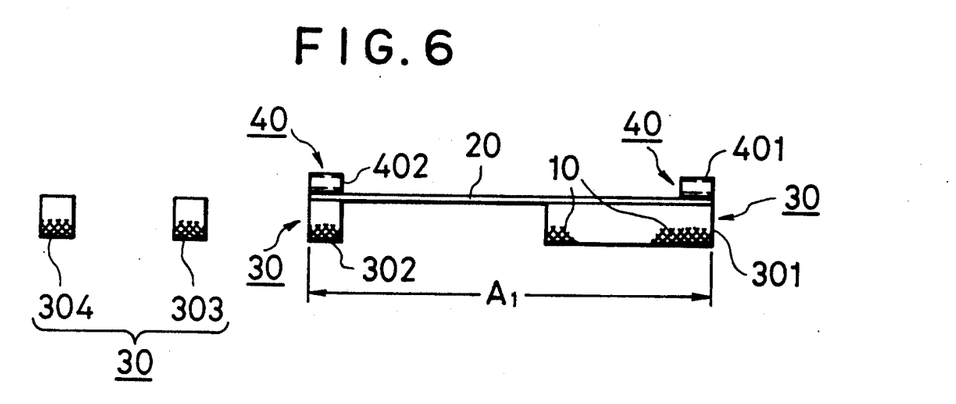
FIG. 6 illustrates the state in which the main and sub drive rollers and the main and sub pinch rollers are in another positional relationship.

First, there will be explained a case where the sub drive roller 302 closest to the main drive roller 301 is used for moving the sheet 20 of small width. As illustrated in FIGS. 5 and 6, the sheet 20 held between the sub drive roller 302 and the sub pinch roller 402 can be fed in its lengthwise direction with its side edges reliably held between the sub drive roller 302 and the sub pinch roller 402 and between the main drive roller 301 and the main pinch roller 401, respectively, when the width of the sheet 20 falls within a range from the distance $B_0$ between the outer end face of the sub drive roller 302 and that position of the main drive roller 301 which is the width W of the main pinch roller 401 inward of the main drive roller 301 from the inner end face thereof, up to the distance $A_1$ between the outer end face of the sub drive roller 302 and that of the main drive roller 301. That is, in the case of using the sub drive roller 302, any of the sheets 20 whose widths range from the value $B_0$ to the value $A_1$ can be fed.

Figure 7:
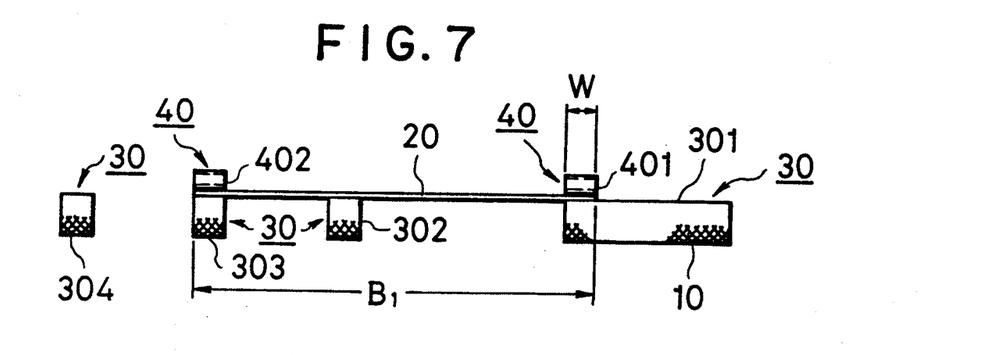
FIG. 7 illustrates the state in which the main and sub drive rollers and the main and sub pinch rollers are in still another positional relationship.
Figure 8:
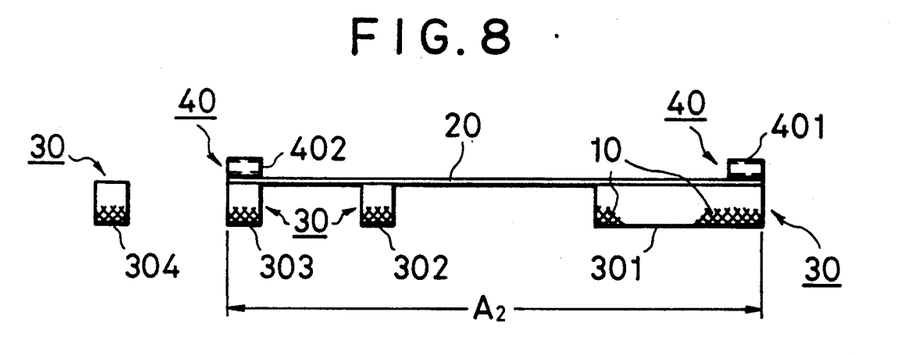
FIG. 8 illustrates the state in which the main and sub drive rollers and the main and sub pinch rollers are in a further positional relationship.

Likewise, as illustrated in FIGS. 7 and 8, the sheet 20 held between the second sub drive roller 303 as viewed from the main drive roller 301 and the sub pinch roller 402 moved to overlie this drive roller 303 can be fed in its lengthwise direction on the recording surface 22 with its side edges reliably held between the sub drive roller 303 and the sub pinch roller 402 and between the main drive roller 301 and the main pinch roller 401, respectively, when the width of the sheet 20 falls within a range from the distance $B_1$ between the outer end face of the sub drive roller 303 and that position of the main drive roller 301 which is the width W of the main pinch roller 401 inward of the main drive roller 301 from the inner end face thereof, up to the distance $A_2$ between the outer end face of the sub drive roller 303 and that of the main drive roller 301. That is, in the case of using the sub drive roller 303, any of the sheets 20 whose widths range from the value $B_1$ to the value $A_2$ can be fed.

Figure 9:
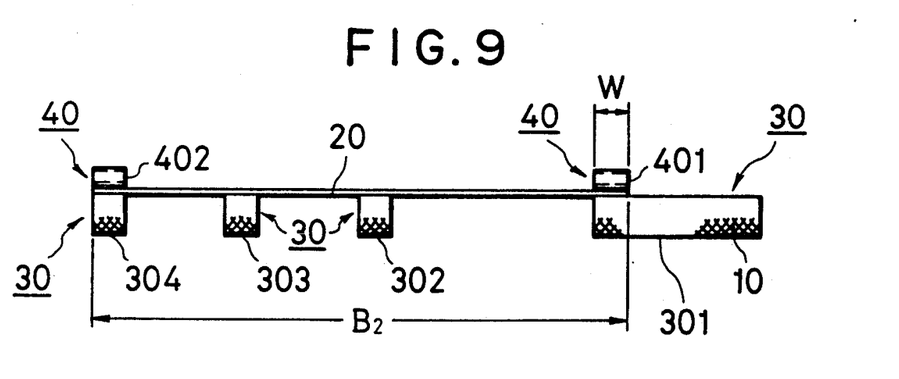
FIG. 9 illustrates the state in which the main and sub drive rollers and the main and sub pinch rollers are in a still further positional relationship.
Figure 10:
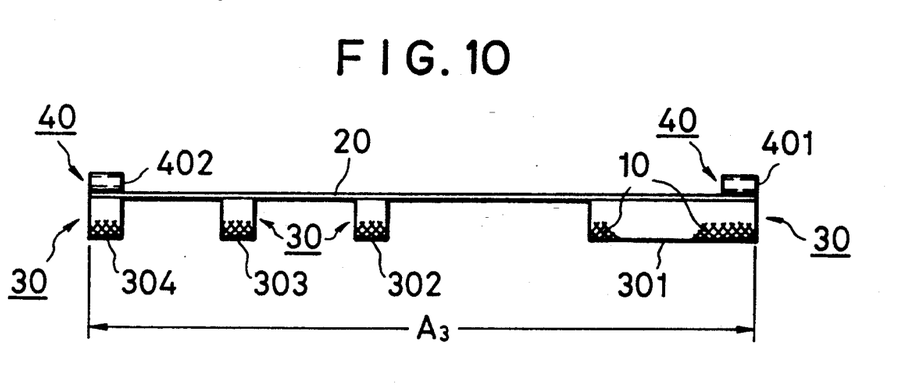
FIG. 10 illustrates the state in which the main and sub drive rollers and the main and sub pinch rollers are in a yet further positional relationship.

Likewise, as understood from FIGS. 9 and 10, in case of using the sub drive roller 304 remotest from the main drive roller 301, any of the sheets 20 whose widths range from a value $B_2$ to a value $A_3$ can be fed.

Accordingly, when the sheet feed mechanism furnished with the three sub drive rollers 302, 303 and 304 is employed, any of the sheets 20 having the widths from $B_0$ to $A_1$, from $B_1$ to $A_2$ and from $B_2$ to $A_3$ can be fed.

As stated before, therefore, the plurality of sub drive rollers 302, 303 and 304 are serially arrayed at the predetermined intervals in succession to the main drive roller 301 so that the distance $A_1$ or $A_2$ between the outer end face of one sub drive roller 302 or 303 and that of the main drive roller 301 may respectively be equal to the distance $B_1$ or $B_2$ between the outer end face of the other sub drive roller 303 or 304 adjoining the specified sub drive roller 302 or 303 on the side remoter from the main drive roller 301 than this sub drive roller and that position of the main drive roller 301 which is the width W of the main pinch roller 401 inward of the main drive roller 301 from the inner end face thereof. Then, each of all the sheets 20 whose widths fall within a predetermined range (in this embodiment, the range from the dimension $B_0$ to the dimension $A_3$) can have its respective side edges reliably held between the sub pinch roller 402 and any of the plurality of sub drive rollers 302, 303 and 304 and between the main pinch roller 401 and the main drive roller 301, fully without waste.

By the way, in a case where $A_1 > B_1$ or $A_2 > B_2$ is met by the distance $A_1$ or $A_2$ between the outer end face of one sub drive roller 302 or 303 and that of the main drive roller 301 and the distance $B_1$ or $B_2$ between the outer end face of the adjacent sub drive roller 303 or 304 and that position of the main drive roller 301 which is the width W of the main pinch roller 401 inward of the main drive roller 301 from the inner end face thereof, part of the sheet 20 whose width can be held between the specified sub drive roller 302 or 303 and the sub pinch roller 402 and between the main drive roller 301 and the main pinch roller 401 overlaps part of the sheet 20 whose width can be held between the adjacent sub drive roller 303 or 304 and the sub pinch roller 402 and between the main drive roller 301 and the main pinch roller 401. To the contrary, in a case where $A_1 < B_1$ or $A_2 < B_2$ is met, sheets 20 whose widths cannot be held arise in relation to the sheet 20 whose width can be held between the specified sub drive roller 302 or 303 and the sub pinch roller 402 and between the main drive roller 301 and the main pinch roller 401 and to the sheet 20 whose width can be held between the adjacent sub drive roller 303 or 304 and the sub pinch roller 402 and between the main drive roller 301 and the main pinch roller 401.

According to the sheet feed mechanism of the above construction, all of the sheets 20 whose widths fall within the predetermined range can favorably be fed in its lengthwise direction on the recording surface 22 in the state in which its respective side edges are reliably held between the main drive roller 301 and the main pinch roller 401 moved a predetermined distance over this drive roller 301 and in the axial direction thereof and between one of the plurality of sub drive rollers 302, 303 and 304 and the sub pinch roller 402 moved so as to overlie the specified sub drive roller, fully without waste.

Besides, the sheet feed mechanism of the present invention is also applicable to a plotter in which a writing utensil such as pen is mounted on a pen carriage. Such an application makes it possible to fabricate a plotter in which each of sheets having various widths can be fed in the lengthwise direction thereof.

As described above, in the sheet feed mechanism of the present invention, regarding drive rollers for holding a sheet, a plurality of shorter sub drive rollers are disposed in a serial array at predetermined intervals in succession to a longer main drive roller, and the number of the sub drive rollers to be arrayed serially to the main drive roller is successively increased on a side remote from the main drive roller and a side close to the main drive roller) whereby each of sheets having widths in a wide range can be moved in the lengthwise direction thereof.

According to the sheet feed mechanism of the present invention, therefore, a sheet feed mechanism with which each of sheets having widths in a wide range can be fed in the lengthwise direction thereof and which is suited to mass production can be fabricated without forming the main drive roller to be longer, by the expedient that the number of the sub drive rollers to be arrayed serially to the main drive roller is merely increased.

Moreover, in the sheet feed mechanism of the present invention wherein a plurality of sub drive rollers are serially arrayed at predetermined intervals in succession to a main drive roller so that the distance between the outer end face of one of the sub drive rollers and the outer end face of the main drive roller may be equal to the distance between the outer end face of another of the sub drive rollers adjoining the specified sub drive roller on a side remoter from the main drive roller than this specified roller and that position of the main drive roller which is the width of a main pinch roller inward of the main drive roller from the inner end face thereof, each of all sheets having widths in a predetermined range can be moved in the lengthwise direction thereof, fully without waste.

The preferred embodiments described in this specification and illustrated in the drawings are exemplary and are not restrictive, and various other modifications are, of course, possible. The scope of the invention is defined by the appended claims, and all modifications falling within the significances of those claims shall be covered within the present invention.

What is claimed is:

1. A sheet feed mechanism for a plotter comprising:
a drive roller group including a first drive roller, and a plurality of second drive rollers which are serially arranged at predetermined spacings from said first drive roller along a first axis, and
a pinch roller group including a first pinch roller which is opposite to said first drive roller and is positioned on a second axis parallel to the first axis, the first pinch roller is rotatable and movable over and axially offset from said first drive roller and which has an axial length smaller than that of said first drive roller, and a second pinch roller positioned on the second axis which is opposite to one of said second drive rollers and which is rotatable and movable over and axially offset from said second drive rollers, the first drive roller being engageable with the first pinch roller and having an axial length which can engage the first pinch roller and which is longer than an engageable axial length of the first pinch roller, the second pinch roller is selectively engageable with each one of the second drive rollers so that the second pinch roller coacts with a selected second drive roller in a corresponding position where one side end of a sheet is located when the other side end of the sheet is held between the first drive roller and the first pinch roller to transport a sheet between the second pinch roller and one of the second drive rollers,
wherein a sheet is held between said drive roller group and said pinch roller group, and said drive roller group is rotated, thereby to move the sheet in a lengthwise direction thereof.

2. A plotter comprising:
a recording surface on which a sheet is placed,
a main drive roller which is mounted inside said recording surface with its peripheral surface partially exposed over said recording surface,
a main pinch roller which is positioned opposite to said main drive roller, which is rotatable and movable over and axially along said main drive roller and which has an axial length smaller than that of said main drive roller, the main drive roller being formed with a portion thereof engageable with the main pinch roller and the axial length of that portion being larger than a corresponding portion of the main pinch roller which is capable of engaging with the main drive roller,
sub drive roller means mounted inside said recording surface with its peripheral surface partially exposed over said recording surface, and arranged serially at a predetermined spacing from said main drive roller, and
a sub pinch roller which is positioned opposite to said sub drive roller means and which is rotatable and movable over and axially offset from said sub drive roller means,
wherein both side edges of the sheet are respectively held between said main drive roller and said main pinch roller and between said sub driver roller means and said sub pinch roller, and said main driver roller and said sub drive roller means are synchronously rotated, thereby to move the sheet on said recording surface in a lengthwise direction thereof, and
wherein said sub drive roller means includes a plurality of sub drive rollers each of which is mounted inside said recording surface with its peripheral surface partially exposed over said recording surface, and which are arranged serially in relation to said main drive roller at predetermined intervals, the sub pinch roller engageable with any one of the sub drive rollers.

3. A sheet feed mechanism for transporting a sheet comprising:
a plurality of drive rollers aligned along an axis, one drive roller being axially longer than at least a pair of other drive rollers, the respective drive rollers being spaced from each other with the longer drive roller being at one end of said axis;
at least a pair of pinch rollers positioned above the axis of the drive rollers and dimensioned to co-act with the drive rollers for transporting the sheet, the number of pinch rollers being less than the number of drive rollers, and means for individually moving the respective pinch rollers relative to the drive rollers to predetermined positions adjacent the axis, including a set of positions adjacent either end of the longer drive roller, the longer drive roller being axially longer than each of the pinch rollers.

4. A sheet feed mechanism for a plotter comprising:
a drive roller group including a first drive roller, and a plurality of second drive rollers which are serially arranged at predetermined spacings from said first drive roller along a first axis, and a pinch roller group including a first pinch roller which is opposite to said first drive roller and is positioned on a second axis parallel to the first axis, the first pinch roller is rotatable and movable over and axially offset from said first drive roller and has an axial length smaller than that of said first drive roller, and a second pinch roller positioned on the second axis which can be positioned opposite to and engageable with one of said second drive rollers and which is rotatable and movable over and axially offset from said second drive rollers, said second drive rollers being respectively arranged so that an axial distance between an outer end face of said first drive roller and an outer end face of one of said second drive rollers is equal to a sum of the width of said first pinch roller and an axial distance between an inner end face of said first drive roller and an outer end face of another of said second drive rollers adjoining said one second drive roller on a side remote from said first drive roller, wherein a sheet is held between said drive roller group and said pinch roller group, and said drive roller group is rotated, thereby to move the sheet in a length wise direction thereof.

5. A plotter comprising:
a recording surface on which a sheet is placed;
a main drive roller which is mounted inside said recording surface with its peripheral surface partially exposed over said recording surface;
a main pinch roller positioned opposite to said main drive roller, and rotatable and movable over and axially along said main drive roller, and which has an axial length smaller than that of said main drive roller;
sub drive roller means mounted inside said recording surface with its peripheral surface partially exposed over said recording surface, and arranged serially at a predetermined spacing from said main drive roller, including a plurality of sub drive rollers, each of which is mounted inside said recording surface with its peripheral surface partially exposed over said recording surface, and which are arranged serially in relation to said main drive roller at predetermined intervals, said sub drive rollers being respectively arranged so that a distance between an outer end face of said main drive roller and an outer end face of one of said sub drive rollers is equal to a sum of the width of said main pinch roller and a distance between an inner end face of said main drive roller and an outer end face of another of said sub drive rollers adjoining said one sub drive roller on a side remote from said main drive roller;

sub pinch rollers which are positioned opposite to said sub drive roller means and which are rotatable and movable over and axially along said sub drive roller means;

a guide member which is mounted over said recording surface so as to extend in a widthwise direction of said recording surface, and to which said main and sub pinch rollers are movably attached;

support members by which said main and sub pinch rollers are respectively attached to said guide member and which are movable in a lengthwise direction of said guide member, and engagement means provided between said support members and said guide member for fixing said support members, including a slot which is formed in an outer peripheral surface of said guide member so as to extend in the lengthwise direction of said guide member, small balls which are disposed in correspondence with said respective support members, and springs which are disposed in correspondence with said respective support members and each of which urges one of the corresponding small balls against a bottom surface of said slot, wherein both side edges of the sheet are respectively held between said main drive roller and said main pinch roller and between said sub drive roller means and said sub pinch roller, and said main drive roller and said sub drive roller means are synchronously rotated, thereby to move the sheet on said recording surface in a lengthwise direction thereof.

6. A plotter as defined in claim 5, wherein said engagement means further comprises a plurality of dents formed in the bottom surface of said slot at predetermined intervals so as to receive a part of one of said balls.

7. A sheet feed mechanism for transporting a sheet comprising:
a plurality of drive rollers aligned along an axis, one drive roller being axially longer than at least a pair of other drive rollers, the respective drive rollers being spaced from each other with the longer drive roller being at one end;

at least a pair of pinch rollers positioned above the axis of the drive rollers and dimensioned to coact with the drive rollers for transporting the sheet, and means for individually moving the respective pinch rollers to predetermined positions adjacent the axis, including a set of positions adjacent either end of the longer drive roller, including a support housing having a circular aperture with an axis parallel to the axis of the drive rollers, a clamp shaft, having at least diametrically opposed partial circular surfaces, movable positioned in the circular aperture, and means for securing the support housing at a desired position, extending along a noncircular surface of the clamp shaft.

8. A sheet feed mechanism for a plotter comprising:
a drive roller group including a first drive roller, and a plurality of second drive rollers which are serially arranged at predetermined spacings from said first drive roller along a first axis, and a pinch roller group including a first pinch roller which is opposite to said first drive roller and is positioned on a second axis parallel to the first axis, the first pinch roller is rotatable and movable over and axially offset from said first drive roller and has an axial length smaller than that of said first drive roller, and a second pinch roller positioned on the second axis which is opposite to one of said second drive rollers and which is rotatable and movable over and axially offset from said second drive rollers, the first drive roller being engageable with the first pinch roller and having an axial length which can engage the first pinch roller and which is longer than an engageable axial length of the first pinch roller, wherein a sheet is held between said drive roller group and said pinch roller group, and said drive roller group is rotated, thereby to move the sheet in a lengthwise direction thereof, and said second drive rollers are respectively arranged so that an axial distance between an outer end face of said first drive roller and an outer end face of one of said second drive rollers is equal to a sum of the width of said first pinch roller and an axial distance between an inner end face of said first drive roller and an outer end face of another of said second drive rollers adjoining said one second drive roller on a side remote from said first drive roller.

9. A plotter comprising:

a recording surface on which a sheet is placed, a main drive roller which is mounted inside said recording surface with its peripheral surface partially exposed over said recording surface, a main pinch roller which is positioned opposite to said main drive roller, which is rotatable and movable over and axially along said main drive roller and which has an axial length smaller than that of said main drive roller, the main drive roller being formed with a portion thereof engageable with the main pinch roller and the axial length of that portion being larger than a corresponding portion of the main pinch roller which is capable of engaging with the main drive roller, sub drive roller means mounted inside said recording surface with its peripheral surface partially exposed over said recording surface, and arranged serially at a predetermined spacing from said main drive roller, and a sub pinch roller which is positioned opposite to said sub drive roller means and which is rotatable and movable over and axially offset from said sub drive roller means, wherein both side edges of the sheet are respectively held between said main drive roller and said main pinch roller and between said sub drive roller means and said sub pinch roller, and said main driver roller and said sub drive roller means are synchronously rotated, thereby to move the sheet on said recording surface in a lengthwise direction thereof, and said sub drive roller means includes a plurality of sub drive rollers each of which is mounted inside said recording surface with its peripheral surface partially exposed over said recording surface, and which are arranged serially in relation to said main drive roller at predetermined intervals, and sub drive rollers are respectively arranged so that a distance between an outer end face of said main drive roller and an outer end face of one of said sub drive rollers is equal to a sum of the width of said main pinch roller and a distance between an inner end face of said main drive roller and an outer end face of another of said sub drive rollers adjoining said one sub drive roller on a side remote from said main drive roller.

10. A plotter as defined in claim 9, further comprising a guide member which is mounted over said recording surface so as to extend in a widthwise direction of said recording surface, and to which said main and sub pinch rollers are movable attached.

11. A plotter as defined in claim 10, further comprising supporters by which said main and sub pinch rollers are respectively attached to said guide member and which are movable in a lengthwise direction of said guide member, and engagement means provided between said supporters and said guide member for fixing said supporters.

12. A plotter as defined in claim 11, wherein said engagement means includes a slot which is formed in an outer peripheral surface of said guide member so as to extend in the lengthwise direction of said guide member, small balls which are disposed in correspondence with said respective supporters, and springs which are disposed in correspondence with said respective supporters and each of which urges one of the corresponding small balls against a bottom surface of said slot.

* * * * *